United States Patent
Chen

(10) Patent No.: US 9,973,471 B2
(45) Date of Patent: *May 15, 2018

(54) PROTECTION METHOD AND COMPUTER SYSTEM THEREOF FOR FIREWALL APPARATUS DISPOSED TO APPLICATION LAYER

(71) Applicant: Wistron Corporation, New Taipei (TW)

(72) Inventor: Chih-Ming Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 387 days.

This patent is subject to a terminal disclaimer.

(21) Appl. No.: 14/797,184

(22) Filed: Jul. 13, 2015

(65) Prior Publication Data

US 2016/0261560 A1 Sep. 8, 2016

(30) Foreign Application Priority Data

Mar. 5, 2015 (TW) .............................. 104107064 A

(51) Int. Cl.
*G06F 9/00* (2006.01)
*H04L 29/06* (2006.01)
*G06N 99/00* (2010.01)

(52) U.S. Cl.
CPC .......... *H04L 63/02* (2013.01); *H04L 63/0245* (2013.01); *H04L 63/145* (2013.01); *G06N 99/005* (2013.01)

(58) Field of Classification Search
CPC .... H04L 63/0245; H04L 63/02; H04L 63/145
USPC ........................................................ 726/11
See application file for complete search history.

(56) References Cited

U.S. PATENT DOCUMENTS 7,586,851 B2    9/2009 Panigrahy

*Primary Examiner* — Teshome Hailu
(74) *Attorney, Agent, or Firm* — Winston Hsu

(57) ABSTRACT

A protection method, which releases an attack of a malware to a firewall apparatus disposed at an application layer, includes processing a microbatching operation in a plurality of session channels and at at least an operational period according to at least one input information, to generate a plurality of session-specific firewall patterns; and merging the plurality of session-specific firewall patterns to generate an application-specific firewall pattern at the application layer, so as to dispose a script information corresponding to the application-specific firewall pattern in the firewall apparatus for releasing the attack of the malware, wherein the microbatching operation is processed to generate a plurality of independent subset-specific firewall patterns in each session channel, so as to generate a session-specific firewall pattern corresponding to each session channel.

16 Claims, 4 Drawing Sheets

PROTECTION METHOD AND COMPUTER SYSTEM THEREOF FOR FIREWALL APPARATUS DISPOSED TO APPLICATION LAYER

BACKGROUND OF THE INVENTION

1. Field of the Invention

The present invention relates to a protection method and a computer system thereof applied to a firewall apparatus at the application layer, and more particularly, to a protection method and a computer system thereof which simultaneously refers to all transmission information in a plurality of session channels for protecting the firewall apparatus at the application layer.

2. Description of the Prior Art

During the network service rapidly developing, people are used to highly rely on the network information, which results in the entrance of a variety of malware, e.g. virus, spyware, adware or spam, through the related network services to hack or attack people's computer systems, mobile devices or other electronic devices connecting to the network for processing some applications (e.g. smart watch). Accordingly, software/hardware of the computer systems or mobile devices could be damaged, and some electronic files therein might be stolen.

To strengthen the protection of the computer system or the mobile device, a firewall apparatus or related antivirus software may be applied to the application layer to recognize or isolate the potential malware. For the rapid and unpredictable changes of program codes of the malware, the antivirus software of the computer system and the mobile device must be timely updated in order to download the latest virus pattern information. Besides, the conventional firewall apparatus only processes the detection in single session channel of the session layer of the OSI Model (Open System Interconnection Reference Model), and many advanced malware or virus could cleverly divide/separate its transmission packets into many sub-packets to be transmitted in different session channels of the session layer, so as to avoid the detection of the firewall apparatus or the related antivirus software. Accordingly, the firewall apparatus or the related antivirus software may be difficult to precisely recognize/detect/isolate all the sub-packets indifferent session channels of the session layer, such that the electronic devices receiving the information via the application layer may be possible defected or attacked by the potential malware.

Therefore, it has become an important issue to provide a protection method and a computer system thereof for the firewall apparatus disposed at the application layer, so as to release the attack of potential malware.

SUMMARY OF THE INVENTION

Therefore, the primary objective of the present invention is to provide a protection method and a computer system thereof for the firewall apparatus disposed at the application layer, so as to release the attack of potential malware.

The present invention discloses a protection method to be utilized for releasing an attack of a malware to a firewall apparatus disposed at an application layer. The protection method comprises processing a microbatching operation in a plurality of session channels and at at least an operational period according to at least one input information, to generate a plurality of session-specific firewall patterns of the plurality of session channels; and merging the plurality of session-specific firewall patterns to generate an application-specific firewall pattern at the application layer, so as to dispose a script information corresponding to the application-specific firewall pattern in the firewall apparatus for releasing the attack of the malware; wherein the microbatching operation processes a pattern recombination operation to generate a plurality of independent subset-specific firewall patterns in each session channel, so as to generate a session-specific firewall pattern corresponding to each session channel according to the plurality of subset-specific firewall patterns.

The present invention further discloses a computer system coupled to a firewall apparatus disposed at an application layer for releasing an attack of a malware. The computer system comprises a processing unit; and a storage device, coupled to the processing unit and storing a program code for processing a protection method. The protection method comprises processing a microbatching operation in a plurality of session channels and at at least an operational period according to at least one input information, to generate a plurality of session-specific firewall patterns of the plurality of session channels; and merging the plurality of session-specific firewall patterns to generate an application-specific firewall pattern at the application layer, so as to dispose a script information corresponding to the application-specific firewall pattern in the firewall apparatus for releasing the attack of the malware; wherein the microbatching operation processes a pattern recombination operation to generate a plurality of independent subset-specific firewall patterns in each session channel, so as to generate a session-specific firewall pattern corresponding to each session channel according to the plurality of subset-specific firewall patterns.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in sub-module. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
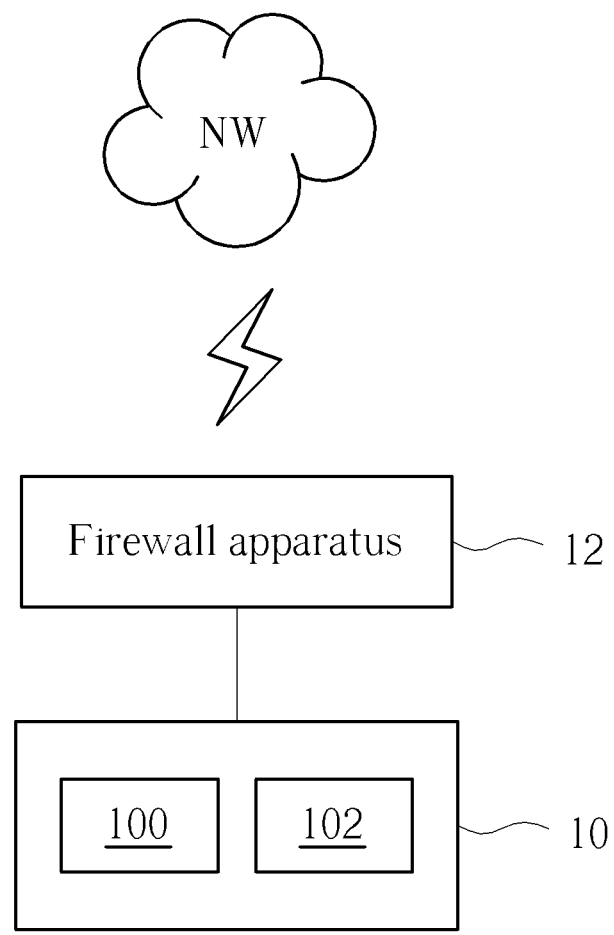
FIG. 1 illustrates a schematic diagram of a computer system coupled to a firewall apparatus according to an embodiment of the invention.
Figure 3:
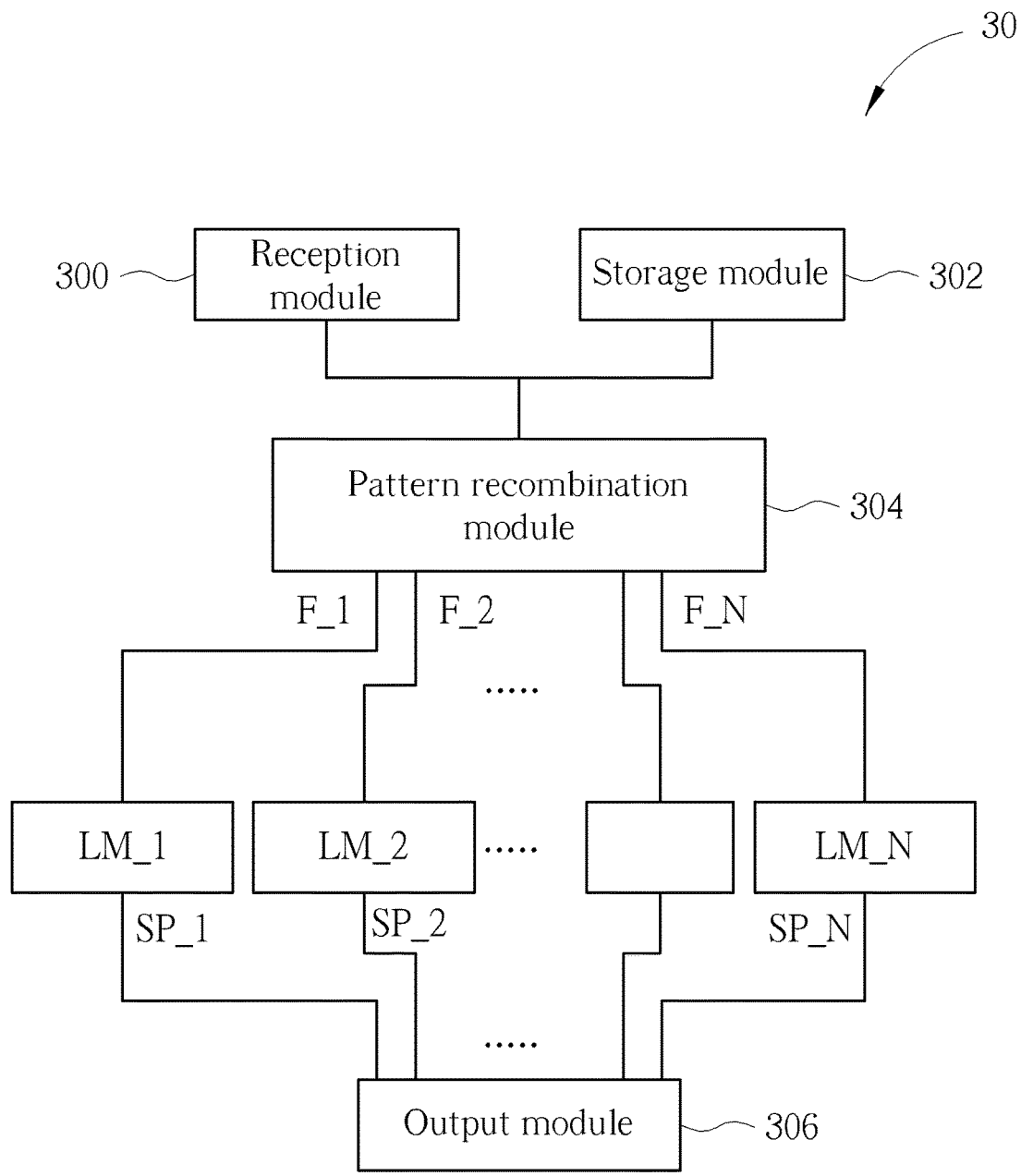
FIG. 3 illustrates a schematic diagram of a session channel module according to an embodiment of the invention.

Please refer to FIG. 3, which illustrates a schematic diagram of a computer system 10 coupled to a firewall apparatus 12 according to an embodiment of the invention. The computer system 10 of the embodiment has a basic structure comprising a main board, a processing unit, a memory, a hard disk, a south-bridge module, a north-bridge module, and etc., and should be well known to those skilled in the art. For the brevity, FIG. 1 of the invention only illustrates a processing unit 100 and a storage device 102. The storage device 102 can be, but not limited to, read-only memory (ROM), random-access memory (RAM), flash, floppy disk, hardware disk, compact disc, USB flash drive, tape, database accessed via the Internet, or other types of storage medium known to those skilled in the art, to store a program code, such that the processing unit 100 can process the program code to operate a protection method for the firewall apparatus 12. The firewall apparatus 12 is disposed at the application layer which is the top layer of the OSI model, and is utilized to bridge the computer system 10 and a Network NW. Also, the firewall apparatus 12 can equip collaborative hardware, software or firmware to cooperate with the protection method, so as to release the firewall apparatus 12 from the attack or invasion of the potential malware (e.g. virus, spyware, adware or spam) via the Network NW.

Certainly, the embodiment of the invention only depicts single computer system 10 coupled to single firewall apparatus 12, and other embodiments can be realized as the case of multiple computer systems coupling to single firewall apparatus or multiple computer systems coupling to multiple firewall apparatuses, i.e. the number of the computer system 10 and the firewall apparatus 12 can be adaptively modified/adjusted according to different requirements, which is not limiting the scope of the invention. Also, the transmission between the computer system 10 and the firewall apparatus 12 can be a wireless transmission or a wired transmission. The program code corresponding to the protection method can be adaptively stored in a storage unit of the firewall apparatus 12, such that the firewall apparatus 12 can independently process the protection method, which is also within the scope of the invention.

In the embodiment of the invention, the malware can be obtained from a computing device, a remote storage device, an application or a network information, and the malware may also be generated through the case as delivering/accessing electronic files from the Network NW, processing/installing specific applications, or browsing certain webpages, etc. Additionally, the computer system 10 and the firewall apparatus 12 of the embodiment have installed the related antivirus software/program, which may utilize a virus database including a plurality of recognized information for preliminarily detect/recognize the partial or all pattern information of the malware.

In the prior art, it only detects the transmission packets transmitted in single session channel of the session layer, such that it is impossible to simultaneously compare or examine all the transmission packets in every session channels. In comparison, the protection method of the embodiment can be operated in the plurality of session channels of the OSI model to simultaneously examine or detect the transmission packets thereof. Further, the embodiment of the invention also cooperates with a structured prediction machine learning model for predicting, learning or training operations, and the structured prediction machine learning model is configured in each session channel. Accordingly, all the transmission packets in every session channels may process a microbatching operation to automatically predict, learn or train all/partial pattern information of the potential malware, so as to transmit the predicted, learned or trained results to the top application layer of the OSI model for further analysis, integration and combination operation. Also, a protection or defense mechanism/operation corresponding to the predicted, learned or trained results may be applied to the firewall apparatus coupled to the application layer, so as to release the attack or invasion of the potential malware. The structured prediction machine learning model of the embodiment can be realized as a software or hardware implementation to be cooperated inside the computer system 10 or the firewall apparatus 12, which is not limiting the scope of the invention.

Certainly, in order to assisting all the session channels to simultaneously process the predicting, learning or training operation for the transmission packets, the computer system 10 of the embodiment can be regarded as one combination/assembling unit of a plurality of computer modules, i.e. each computer module comprises a central processing unit (or a graphic processing unit) and a storage unit to independently process the microbatching operation for each session channel, and the plurality of computer modules are connected to each other (via a wireless communication or a wired communication) to share the predicted, learned or trained results. More detailed operations of the protection method are discussed in the following paragraphs.

Figure 2:
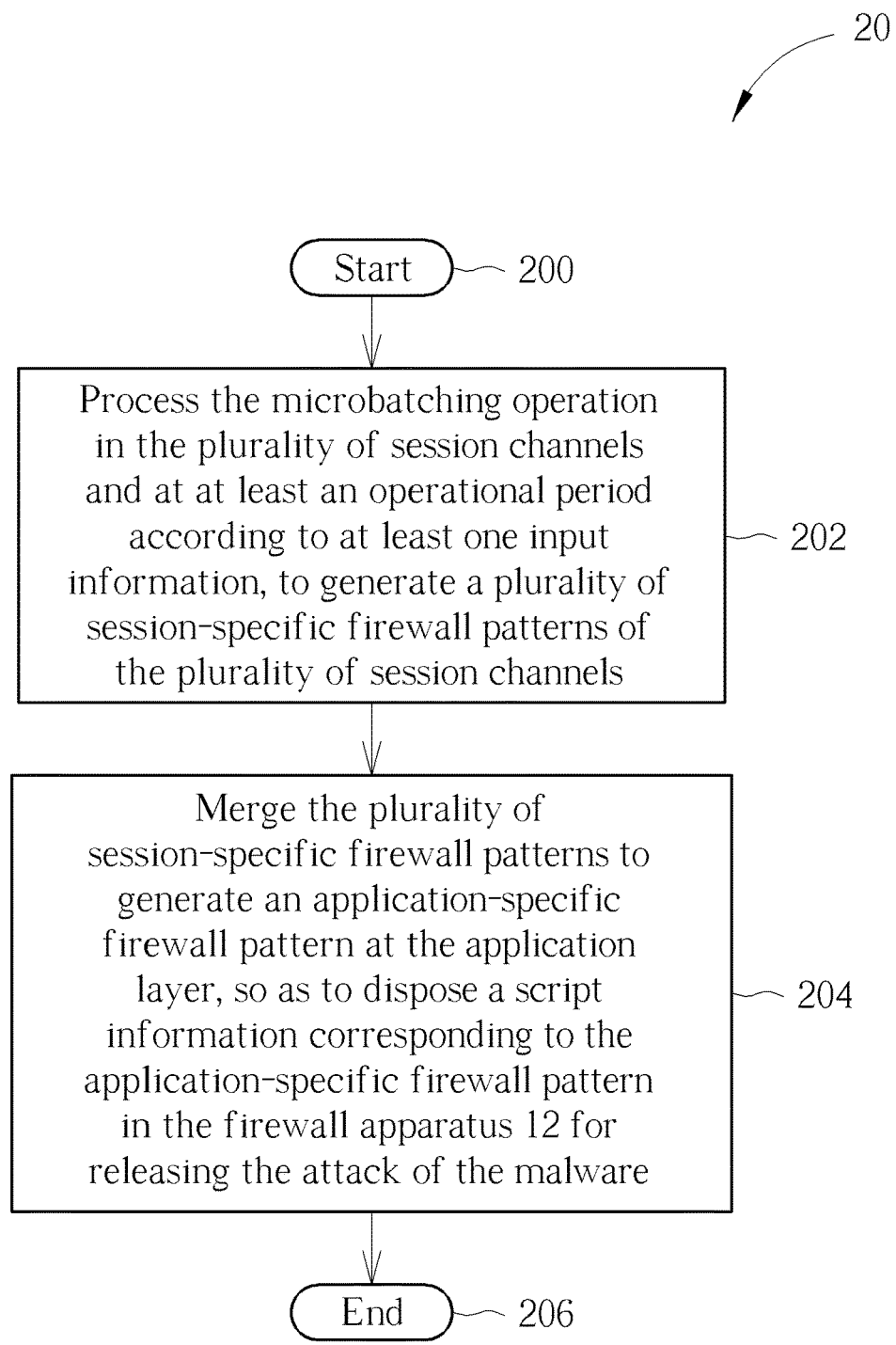
FIG. 2 illustrates a flowchart diagram of a protection process according to an embodiment of the invention.

Further, the protection method for the firewall apparatus 12 of the invention can be summarized as a protection process 20 to be stored as the program code in the storage device 102 (or in the storage unit of the firewall apparatus 12). The protection process 20, as shown in FIG. 2, of the invention comprises the following steps:

Step 200: Start.

Step 202: Process the microbatching operation in the plurality of session channels and at at least an operational period according to at least one input information, to generate a plurality of session-specific firewall patterns of the plurality of session channels.

Step 204: Merge the plurality of session-specific firewall patterns to generate an application-specific firewall pattern at the application layer, so as to dispose a script information corresponding to the application-specific firewall pattern in the firewall apparatus 12 for releasing the attack of the malware.

Step 206: End.

In the embodiment, if the user utilizes the computer system 10 and the firewall apparatus 12 to connect to the Network NW, the protection process 20 (i.e. step 200) may be correspondingly initiated, and the computer system 10 is allowed to receive at least one input information from the network NW. Certainly, the computer system 10 and the firewall apparatus 12 of the embodiment have installed the antivirus software and related programs, which can periodically process the updating operation to download the latest virus pattern information for maintaining the virus database inside the computer system 10 and the firewall apparatus 12 being the latest virus pattern information, such that the computer system 10 (or the firewall apparatus 12) can pre-store the latest virus pattern information in advance for the following operations.

In step 202, the central processing unit 100 may process the microbatching operation inside each session channel of the session layer in the OSI model according to the received input information at the first operation period, to generate the plurality of session-specific firewall patterns of the plurality of session channels. Preferably, the embodiment of the invention has disposed many central processing units (or the graphic processing units) to simultaneously process the microbatching operation for the plurality of session channels, so as to precisely and rapidly predict the plurality of independent session-specific firewall patterns and improve the processing efficiency as well as the learning/updating speed of the protection process 20. Due to the design of the OSI model, the input information of the embodiment can be regarded as the communication information of the plurality of applications between the computer system 10 and the network NW, and a transmission path thereof is virtually established via the plurality of session channels between the computer system 10 and the network NW, such that the dissipation of the transmission information between the computer system 10 and the network NW may be initiated for transmitting the related transmission packets. Other detailed operations/mechanisms between other layers in the OSI model are not the main scope of the invention, and will be neglected for brevity.

For the convenience, the following embodiment will demonstrate one session channel module in the OSI model to detailed explain how the microbatching operation is operated in each session channel. Please refer to FIG. 3, which illustrates a schematic diagram of a session channel module 30 according to an embodiment of the invention. As shown in FIG. 3, the session channel module 30 of the embodiment comprises a reception module 300, a storage module 302, a pattern recombination module 304, structured prediction machine learning modules LM_1-LM_N and an output module 306. The reception module 300 is utilized to receive the input information from the network NW, and correspondingly retrieve at least one input pattern information from the input information. The storage module 302 is utilized to store the pre-stored pattern information, which is utilized to recognize the virus pattern information of the malware with the timely updating operation. The pattern recombination module 304 is coupled to the reception module 300, a storage module 302 and the structured prediction machine learning modules LM_1-LM_N, to correspondingly receive the input pattern information and the pre-stored pattern information for processing the pattern recombination operation, i.e. the pattern recombination module 304 will merge the input pattern information and the pre-stored pattern information to generate the updating pattern information, and the updating pattern information can be a plurality of independent subset-specific patterns F_1-F_N. For example, each subset-specific pattern can represent one type of the classification cluster information, such as individual health information, personal hobby information, family background information, or career/occupation information, and all the classification cluster information are independent to each other with no correlation/overlapping information. Accordingly, after the pattern recombination operation is completed, the pattern recombination module 304 may correspondingly output the classified subset-specific patterns F_1-F_N to the structured prediction machine learning modules LM_1-LM_N.

Further, each structured prediction machine learning module in the session channel module 30 may refer to the classified subset-specific patterns F_1-F_N to process the automatic predicting, learning and training operation. For example, the subset-specific patterns F_1-F_N may be inputted into a joint feature function for co-learning/training operation, to predict partial or all pattern information of the potential malware, so as to generate the session-specific firewall patterns SP_1-SP_N to the output module 306. The co-learning/training operation of the joint feature function in the embodiment can be processed, for example, via operations/computations of the transductive machine learning and the inductive machine learning, which is not limiting the scope of the invention.

Certainly, in another embodiment, every structured prediction machine learning module in the session channel module 30 can also obtain subset-specific firewall patterns from other structured prediction machine learning modules for assisting a generation of another subset-specific firewall pattern at another operational period (e.g. a second operational period). In other words, different structured prediction machine learning modules share the subset-specific firewall patterns with each other, to compare, analyze or integrate with the subset-specific firewall pattern generated by itself, so as to improve the efficiency and accuracy of the co-learning/training operation, such that another subset-specific firewall pattern may be precisely generated or predicted (or with a higher prediction possibility) in the next operational period to be outputted to the output module 306, which is also in the scope of the invention.

Moreover, the output module 306 of the embodiment is coupled to receive the subset-specific firewall patterns SP_1-SP_N from the structured prediction machine learning modules LM_1-LM_N, so as to integrate and compare correlations of the subset-specific firewall patterns SP_1-SP_N for generating the session-specific firewall pattern of each session channel. In detail, the output module 306 of the embodiment retrieves partial patterns or all patterns from one or many subset-specific firewall patterns SP_1-SP_N to generate the session-specific firewall pattern of each session channel according to similarities, overlapping degrees or differences of the plurality of subset-specific firewall patterns SP_1-SP_N, so as to transmit the plurality of session-specific firewall patterns to the application layer for following operations.

Similarly, in another embodiment, each session channel of the session channel module 30 can receive the session-specific firewall patterns corresponding to other session channels for assisting a generation of another session-specific firewall pattern at another operational period. In other words, after the microbatching operation is completed, the computer modules corresponding to different session channels can share the session-specific firewall patterns with each other, to compare, analyze or integrate with the session-specific firewall pattern generated by itself, so as to improve the efficiency and accuracy of the co-learning/training operation, such that another session-specific firewall pattern may be precisely generated or predicted in the next operational period (or with a higher prediction possibility) for the following operations of the application layer, which is also in the scope of the invention.

Figure 4:
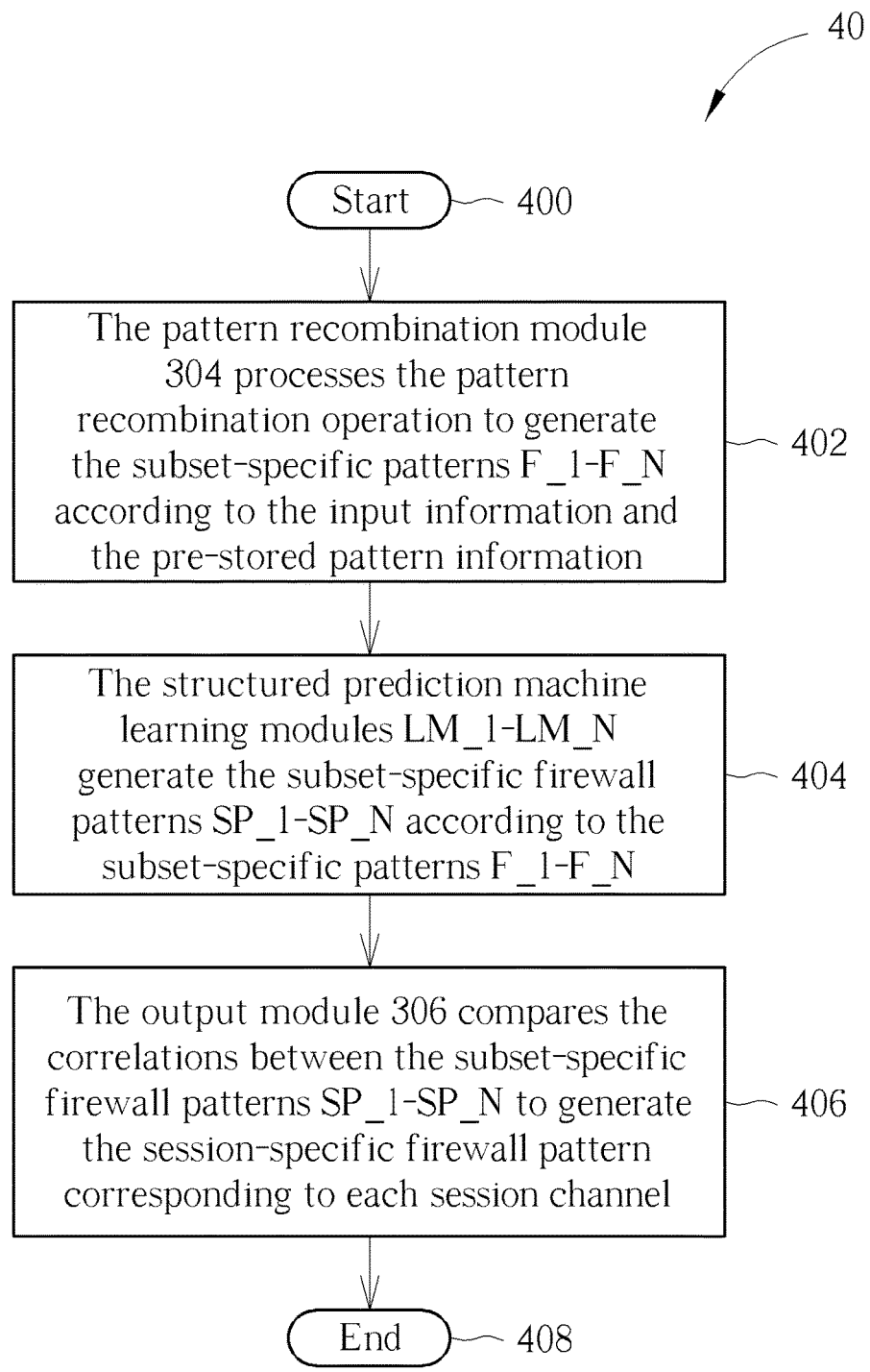
FIG. 4 illustrates a flowchart diagram of a microbatching process according to an embodiment of the invention.

Certainly, each session channel processing the microbatching operation can also be summarized as a microbatching process 40 to be stored as the program code in the storage device 102 (or in the storage unit of the firewall apparatus 12). The microbatching process 40, as shown in FIG. 4, of the invention comprises the following steps:

Step 400: Start.

Step 402: The pattern recombination module 304 processes the pattern recombination operation to generate the subset-specific patterns F_1-F_N according to the input information and the pre-stored pattern information.

Step 404: The structured prediction machine learning modules LM_1-LM_N generate the subset-specific firewall patterns SP_1-SP_N according to the subset-specific patterns F_1-F_N.

Step 406: The output module 306 compares the correlations between the subset-specific firewall patterns SP_1-

SP_N to generate the session-specific firewall pattern corresponding to each session channel.

Step 408: End.

Certainly, the detailed operations of the microbatching operation 40 can be refers to FIG. 3 and related paragraphs of the session channel module 30, which is not described hereinafter for brevity. Accordingly, the embodiment of the invention refers to the session-specific firewall pattern of each session channel to correspondingly obtain the plurality of session-specific firewall patterns of the plurality of session channels, and the following operations may be continuously processed by step 204.

In step 204, the central processing unit (or the processing unit or the graphic processing unit) of the embodiment may combine/merge the plurality of session-specific firewall patterns at the application layer to generate the application-specific firewall pattern for the application layer, so as to dispose the scrip information corresponding to the application-specific firewall pattern in the firewall apparatus 12 for releasing the attack or invasion of the potential malware. Preferably, the central processing unit may control the application layer to retrieve partial patterns or all patterns from one or many session-specific firewall patterns for generating the application-specific firewall pattern, so as to dispose the script information corresponding to the application-specific firewall pattern in the firewall apparatus 12 for releasing the attack or invasion of the potential malware.

In the embodiment, the application-specific firewall pattern is utilized to recognize the partial or all pattern information of the potential malware, and the script information corresponding to the application-specific firewall pattern is utilized to process filtering, isolating or deleting operations for the recognized partial or all pattern information of the potential malware. Preferably, the embodiment of the invention is not limiting the realization of the filtering, isolating or deleting operations for the recognized partial or all pattern information of the potential malware. For example, the common antivirus operation can be realized via an interactive window or message to tell/notice the user of the computer system 10 that the firewall apparatus 12 connecting to the network NW has detected the potential malware, and the interactive window and message can provide a plurality of selective/operational lists corresponding to the specific potential malware for the user, such that the firewall apparatus 12 can adaptively delete or isolate partial or all pattern information of the potential malware carried/transmitted by electronic files and/or corresponding transmission packets. In another embodiment, the protection process 20 of the invention can provide a cognitive analytic results to inform the user of the computer system 10 that the firewall apparatus 12 is currently attacked by a specific potential malware and a specific antivirus operation corresponding to the specific potential malware is suggested to be processed for releasing the attack and invasion of the specific malware in advance, so as to avoid the situation as the computer systems, mobile devices or electronic files therein being damaged.

Certainly, in another embodiment, when each session channel simultaneously processes the microbatching operation to detect or examine that the transmission packets or the electronic files corresponding to the partial or all pattern information of the potential malware have passed through the firewall apparatus 12 and existed in at least one session channel thereof, the embodiment of the invention may dispose the scrip information corresponding to the partial or all pattern information of the potential malware in every plurality of session channels (or in the session channel module 30 of the embodiment), to release the attack or invasion of the potential malware, which is also in the scope of the invention.

In short, the firewall apparatus 12 of the embodiment is cooperated with the protection process 20 and the microbatching process 40, such that the plurality of session-specific firewall patterns corresponding to the plurality of session channels are initially generated, then the application layer refers to the plurality of session-specific firewall patterns for generating the application-specific firewall pattern, and the script information corresponding to the application-specific firewall pattern can be disposed in the firewall apparatus 12 for processing the filtering, isolating or deleting operations against the partial or all pattern information of the potential malware. Certainly, for the sake of operational convenience, the program codes of the protection process 20 and the microbatching operation 40 can be adaptively installed or integrated inside the storage unit of the firewall apparatus 12. Accordingly, once a user initially utilizes his/her electronic device to connect the firewall apparatus 12 for accessing the network NW, the program codes of the protection process 20 and the microbatching operation 40 can be timely operated to process the filtering, isolating or deleting operations for the transmission packets or electronic files of the partial or all pattern information of the potential malware, so as to protect the electronic device from the attack or invasion of the potential malware, which is also within the scope of the invention.

To sum up, the embodiments of the invention provide a protection method and computer system thereof to filter, isolate or delete the pattern information of the potential malware at the application layer. While one computer module is utilized to process the microbatching operation in each session channel, the input information and the pre-stored pattern information are obtained to process the pattern recombination operation for obtaining the subset-specific pattern information, and the plurality of structured prediction machine learning models are utilized to process the co-learning/training for the plurality of subset-specific pattern information, so as to obtain the session-specific pattern information of each session channel. In the meanwhile, the plurality of computer modules obtains the plurality of session-specific firewall pattern. Accordingly, application-specific firewall pattern is obtained according to the plurality of session-specific firewall patterns, and the scrip information corresponding to the application-specific firewall pattern is disposed in the firewall apparatus to filter, isolate or delete the transmission packets or electronic files of the partial or all pattern information of the potential malware. In comparison with the prior art, the embodiments of the invention can simultaneously refer to the transmission packets in the plurality of session channels, and the plurality of session channels and the plurality of structured prediction machine learning modules in one session channel can share the co-learning/training results, to improve the protection mechanism of the structured prediction machine learning modules against the potential malware.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A protection method to be utilized for releasing an attack of a malware to a firewall apparatus disposed at an application layer, the protection method comprising:

processing a microbatching operation in a plurality of session channels and at at least an operational period according to at least one input information, to generate a plurality of session-specific firewall patterns of the plurality of session channels; and merging the plurality of session-specific firewall patterns to generate an application-specific firewall pattern at the application layer, so as to dispose a script information corresponding to the application-specific firewall pattern in the firewall apparatus for releasing the attack of the malware;

wherein the microbatching operation processes a pattern recombination operation to generate a plurality of independent subset-specific firewall patterns, so as to generate a session-specific firewall pattern corresponding to each session channel according to the plurality of subset-specific firewall patterns.

2. The protection method of claim 1, wherein the step of processing the microbatching operation in each session channel further comprises:

processing the pattern recombination operation to generate an updating pattern information according to the input information and a pre-stored pattern information;

generating the plurality of subset-specific firewall patterns according to the updating pattern information and a plurality of structured prediction machine learning models; and comparing the plurality of subset-specific firewall patterns to generate the session-specific firewall pattern corresponding to each session channel.

3. The protection method of claim 2, wherein the pattern recombination operation is processed to obtain at least one input pattern information of the input information, so as to merge the at least one input pattern information and the pre-stored pattern information for generating the updating pattern information.

4. The protection method of claim 2, wherein each structured prediction machine learning model further obtains the plurality of subset-specific firewall patterns from other structured prediction machine learning models for assisting a generation of another subset-specific firewall pattern at another operational period.

5. The protection method of claim 2, wherein the step of comparing the plurality of subset-specific firewall patterns to generate the session-specific firewall pattern corresponding to each session channel further comprises:

retrieving partial patterns or all patterns from one or many subset-specific firewall patterns to generate the session-specific firewall pattern corresponding to each session channel according to similarities, overlapping degrees or differences of the plurality of subset-specific firewall patterns.

6. The protection method of claim 1, further comprising:

each session channel further receiving the session-specific firewall patterns corresponding to other session channels for assisting a generation of another session-specific firewall pattern at another operational period.

7. The protection method of claim 1, wherein the step of merging the plurality of session-specific firewall patterns to generate the application-specific firewall pattern at the application layer, so as to dispose the script information corresponding to the application-specific firewall pattern in the firewall apparatus for releasing the attack of the malware further comprises:

the application layer further retrieving partial patterns or all patterns from one or many session-specific firewall patterns to generate the application-specific firewall pattern, so as to dispose the script information corresponding to the application-specific firewall pattern in the firewall apparatus for releasing the attack of the malware.

8. The protection method of claim 1, further comprises:

disposing the script information in each session channel to release the attack of the malware.

9. A computer system, coupled to a firewall apparatus disposed at an application layer for releasing an attack of a malware, the computer system comprising:

a processing unit; and a storage device, coupled to the processing unit and storing a program code for processing a protection method, the protection method comprising:

processing a microbatching operation in a plurality of session channels and at at least an operational period according to at least one input information, to generate a plurality of session-specific firewall patterns of the plurality of session channels; and merging the plurality of session-specific firewall patterns to generate an application-specific firewall pattern at the application layer, so as to dispose a script information corresponding to the application-specific firewall pattern in the firewall apparatus for releasing the attack of the malware;

wherein the microbatching operation processes a pattern recombination operation to generate a plurality of independent subset-specific firewall patterns in each session channel, so as to generate a session-specific firewall pattern corresponding to each session channel according to the plurality of subset-specific firewall patterns.

10. The computer system of claim 9, wherein the step of processing the microbatching operation in each session channel in the protection method further comprises:

processing the pattern recombination operation to generate an updating pattern information according to the input information and a pre-stored pattern information;

generating the plurality of subset-specific firewall patterns according to the updating pattern information and a plurality of structured prediction machine learning models; and comparing the plurality of subset-specific firewall patterns to generate the session-specific firewall pattern corresponding to each session channel.

11. The computer system of claim 10, wherein the pattern recombination operation is processed to obtain at least one input pattern information of the input information, so as to merge the at least one input pattern information and the pre-stored pattern information for generating the updating pattern information.

12. The computer system of claim 10, wherein each structured prediction machine learning model further obtains the plurality of subset-specific firewall patterns from other structured prediction machine learning models for assisting a generation of another subset-specific firewall pattern at another operational period.

13. The computer system of claim 10, wherein the step of comparing the plurality of subset-specific firewall patterns to generate the session-specific firewall pattern corresponding to each session channel in the protection method further comprises:

retrieving partial patterns or all patterns from one or many subset-specific firewall patterns to generate the session-specific firewall pattern corresponding to each session channel according to similarities, overlapping degrees or differences of the plurality of subset-specific firewall patterns.

14. The computer system of claim 9, wherein the protection method further comprises:

each session channel further receiving the session-specific firewall patterns corresponding to other session channels for assisting a generation of another session-specific firewall pattern at another operational period.

15. The computer system of claim 9, wherein the step of merging the plurality of session-specific firewall patterns to generate the application-specific firewall pattern at the application layer, so as to dispose the script information corresponding to the application-specific firewall pattern in the firewall apparatus for releasing the attack of the malware in the protection method further comprises:

the application layer further retrieving partial patterns or all patterns from one or many session-specific firewall patterns to generate the application-specific firewall pattern, so as to dispose the script information corresponding to the application-specific firewall pattern in the firewall apparatus for releasing the attack of the malware.

16. The computer system of claim 9, wherein the protection method further comprises:

disposing the script information in each session channel to release the attack of the malware.

\* \* \* \* \*